(12) United States Patent
Boesche et al.

(10) Patent No.: US 11,322,319 B2
(45) Date of Patent: May 3, 2022

(54) DISCONNECTING DEVICE FOR INTERRUPTING A DIRECT CURRENT OF A CURRENT PATH, AND ON-BOARD ELECTRICAL SYSTEM OF A MOTOR VEHICLE

(71) Applicant: ELLENBERGER & POENSGEN GMBH, Altdorf (DE)

(72) Inventors: Dirk Boesche, Seershausen (DE); Ernst-Dieter Wilkening, Braunschweig (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 0 days.

(21) Appl. No.: 17/015,316

(22) Filed: Sep. 9, 2020

(65) Prior Publication Data

US 2021/0012981 A1     Jan. 14, 2021

Related U.S. Application Data

(63) Continuation of application No. PCT/EP2019/051718, filed on Jan. 24, 2019.

(30) Foreign Application Priority Data

Mar. 9, 2018  (DE) .......................... 102018203636.5

(51) Int. Cl.
*H01H 9/54*          (2006.01)
(52) U.S. Cl.
CPC ....... *H01H 9/542* (2013.01); *H01H 2009/544* (2013.01); *H01H 2009/546* (2013.01)

(58) Field of Classification Search
CPC .......... H01H 9/541; H01H 9/54; H01H 9/542; H01H 9/548; H01H 33/596; H01H 2009/544; H01H 2009/546; G02B 5/003; G02B 5/22; G02B 1/115; B60R 16/03; H02H 3/025; H02H 3/087
See application file for complete search history.

(56) References Cited

U.S. PATENT DOCUMENTS

| 7,079,363 | B2 | 7/2006 | Chung |
| 8,742,828 | B2 | 6/2014 | Naumann et al. |
| 2003/0193770 | A1* | 10/2003 | Chung ................... H01H 9/542 361/118 |
| 2013/0308356 | A1* | 11/2013 | Subramanium ......... H02J 3/382 363/53 |

(Continued)

FOREIGN PATENT DOCUMENTS

| CH | 588153 A5 | 5/1977 |
| DE | 10315982 A1 | 11/2003 |

(Continued)

*Primary Examiner* — Bryan R Perez
(74) *Attorney, Agent, or Firm* — Laurence A. Greenberg; Werner H. Stemer; Ralph E. Locher

(57) ABSTRACT

A separating device for interrupting a direct current of a current path, in particular for an on-board electrical system of a motor vehicle. The separating device has a hybrid switch with a current-conducting mechanical contact system and a first semiconductor switch connected to the hybrid switch in parallel and having a switchable resistance cascade with at least one ohmic resistor which is connected to the contact system of the hybrid switch in parallel.

7 Claims, 1 Drawing Sheet

(56) References Cited

U.S. PATENT DOCUMENTS

2017/0011875 A1\* 1/2017 Dorn ................. H01H 9/542
2018/0041021 A1 2/2018 Backman et al.

FOREIGN PATENT DOCUMENTS

| DE | 10225259 B3 | 1/2004 |
| EP | 3057117 A1 | 8/2016 |
| WO | 2010108565 A1 | 9/2010 |

\* cited by examiner

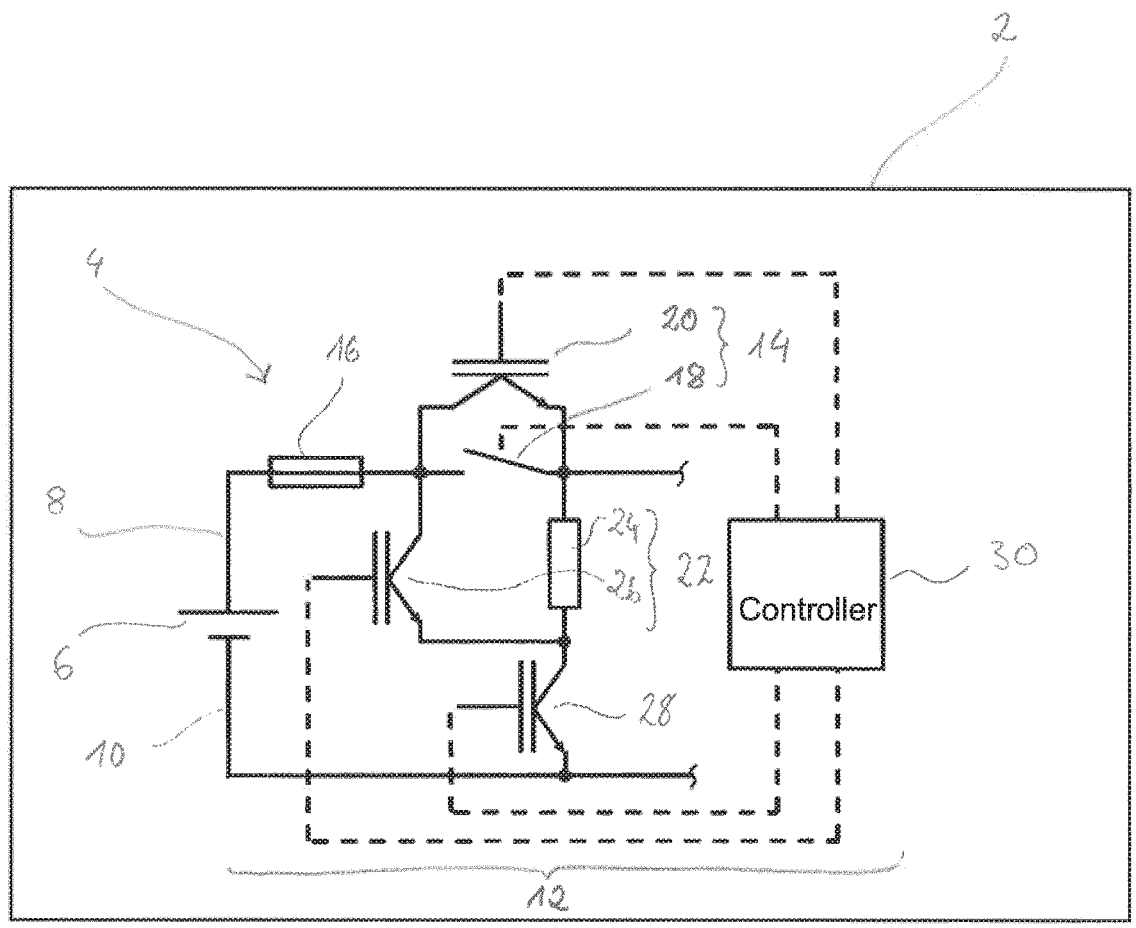

DISCONNECTING DEVICE FOR INTERRUPTING A DIRECT CURRENT OF A CURRENT PATH, AND ON-BOARD ELECTRICAL SYSTEM OF A MOTOR VEHICLE

CROSS-REFERENCE TO RELATED APPLICATION

This application is a continuation, under 35 U.S.C. § 120, of copending international application No. PCT/EP2019/051718, filed Jan. 24, 2019, which designated the United States; this application also claims the priority, under 35 U.S.C. § 119, of German patent application DE 10 2018 203 636, filed Mar. 9, 2018; the prior applications are herewith incorporated by reference in their entirety.

BACKGROUND OF THE INVENTION

Field of the Invention

The invention relates to a disconnecting device for interrupting a direct current of a current path, in particular for an on-board electrical system of a motor vehicle. The invention furthermore relates to an on-board electrical system for a motor vehicle having such a disconnecting device.

On-board electrical systems serve to supply electrical consumers and devices with an operating voltage of the on-board electrical system. Such on-board electrical systems are generally supplied by means of an energy store, for example in the form of an electrochemical battery system. Owing to system dictates, such battery systems on the one hand permanently supply an operating current and an operating voltage having a value of between 12 V and 48 V (DC) in a low-voltage range (LV) and of up to approximately 1500 V (DC) or higher in a high-voltage range (HV). In this case, a reliable disconnection of electrical components or units from the battery system that is effective as a DC source is desired for example for installation, assembly or service purposes and in particular also for general protection of persons. In this case, a corresponding disconnecting device has to be able to perform an interruption under load, that is to say without the DC source being turned off beforehand, reliably and operationally safely.

For load disconnection it is possible to use a mechanical switch (switching contact, contact system) with the advantage that a galvanic isolation of the electrical unit (consumers) from the DC source (battery system) is produced upon contact opening having been effected. By contrast, if powerful semiconductor switches are used for load disconnection, then unavoidable power losses occur at the semiconductor switches even during normal operation. Furthermore, with such power semiconductors it is typically not possible to ensure a galvanic isolation and thus reliable protection of persons.

German patent DE 102 25 259 B3 discloses an electrical plug connector embodied as a load disconnector and containing, in the manner of a hybrid switch, a semiconductor switch and also main and auxiliary contacts, which are connected to a DC source. The main contact, which leads during an unplugging process, is connected in parallel with the lagging auxiliary contact connected in series with the semiconductor switches. In this case, the semiconductor switch is driven for the purpose of avoiding an arc or quenching an arc by the semiconductor switch being switched on and off periodically.

International patent disclosure WO 2010/108565 A1, corresponding to U.S. Pat. No. 8,742,828, discloses a hybrid disconnecting device having a mechanical contact system and a semiconductor switch connected in parallel therewith. The semiconductor switch is coupled to control electronics, the latter not having an additional energy source. When a mechanical contact system is closed, the control electronics and respectively the semiconductor switch block current, which is to say are practically free of current and voltage. The control electronics obtain the energy required for their operation from the disconnecting device, which is to say from the disconnecting switch system itself, the energy of the arc that arises when the mechanical contact system is opened being used. In this case, the control electronics are interconnected with the mechanical contact system on the driving side in such a way that when the contact system opens, the arc voltage across the switching contacts thereof on account of the arc switches the control electronics and thus the semiconductor switch to conduct current.

As soon as the control electronics are switched to conduct a current, the arc current begins to commutate from the mechanical contact system to the semiconductor switch. The arc between the switching contacts of the contact system is quenched as a result.

BRIEF SUMMARY OF THE INVENTION

The invention is based on the object of specifying a particularly suitable disconnecting device (hybrid switch or electronics) for interrupting a direct current of a current path, in particular for an on-board electrical system of a motor vehicle. In particular, the intention in this case is to specify a disconnecting device having improved operational safety, even when switching high on-board electrical system voltages. The invention is furthermore based on the object of specifying a particularly suitable on-board electrical system of a motor vehicle having such a disconnecting device.

The object is achieved according to the invention by means of the features of the independent claim regarding the disconnecting device and by means of the features of the independent claim regarding the on-board electrical system. The respective dependent claims relate to advantageous configurations and developments.

The disconnecting device according to the invention is suitable and configured as a disconnecting switch system for interrupting a direct current of a current path, in particular for an on-board electrical system of a motor vehicle. In this case, the disconnecting device contains a hybrid switch having a current-carrying mechanical contact system (switch) and having a first semiconductor switch connected in parallel therewith. In this case, the first semiconductor switch connected in parallel is open, that is to say turned off or switched to be nonconducting, in a closed state of the mechanical contact system, such that the electric current is passed via the switching path of the mechanical contact system. This ensures particularly low on-state losses of the disconnecting device during normal operation.

The disconnecting device furthermore contains a switchable resistance cascade having at least one ohmic resistor. In this case, the resistance cascade is connected in parallel with the contact system of the hybrid switch. The resistance cascade thus acts as protective circuitry for the hybrid switch. A particularly suitable and operationally safe disconnecting device is realized as a result.

When the contact system opens, an arc that forms is quenched reliably and operationally safely. As a result of the semiconductor switch being closed or turned on, the switching path of the contact system is short-circuited, as a result of which the arc current commutates via the semiconductor switch and the resistance cascade and is thereby quenched.

A disconnecting switch system which saves structural space to a particularly high degree and is particularly compact is realized, in particular, by the disconnecting device according to the invention. As a consequence this is particularly advantageous when applied to a confined installation situation in an on-board electrical system of a motor vehicle.

In an application of the disconnecting device in an on-board electrical system, it is conceivable, for example, for the resistance cascade or the at least one resistor additionally to be usable as a charging and/or discharging resistor for a link circuit capacitor.

In one advantageous embodiment, the resistance cascade is embodied as a cascading switch-off overvoltage limiter (overvoltage limiter). A reliable and operationally safe quenching of arcs is ensured as a result.

In one suitable development, the resistance cascade contains at least one second semiconductor switch connected in series with the at least one resistor. Preferably, the resistance cascade in this case contains a plurality of such resistor and semiconductor switch pairings connected successively in a cascading manner. As a result, it is possible to force a current that occurs step by step or progressively to zero. Preferably, provision is made in this case for the or each second semiconductor switch to be turned on substantially simultaneously with the first semiconductor switch.

In a first preferred embodiment, the hybrid switch, in particular the contact system thereof, is able to be short-circuited by means of a series circuit formed by the resistance cascade together with a third semiconductor switch. As a result, despite absence of galvanic isolation, dangerous contact voltages at the contact system are reliably avoided. Particularly effective and operationally safe protection of persons (finger safety) is ensured as a result.

In one expedient configuration, the or each semiconductor switch is connected to a common controller on the driving side. In this case, the controller is embodied in particular as a common control unit for the first, second and third semiconductor switches. This ensures that the semiconductor switches are switched jointly and reliably. A particularly operationally safe and fast quenching of the arc is thus ensured.

The controller is generally suitable and configured in terms of programming and/or circuit technology for driving the semiconductor switches in the course of a closing or opening process of the mechanical contact system. The controller is thus specifically configured, during a closing process in which the contacts of the contact system are closed, to drive the semiconductor switches in such a way that the contact system can be switched on with no voltage. During an opening process, the controller drives the semiconductor switches in such a way that an arc between the opening contacts of the contact system is quenched reliably and promptly, and touch protection, in particular with the aim of sufficient "finger safety", is ensured.

In a preferred configuration, the controller is formed at least in essence by a microcontroller having a processor and having a data memory, in which the functionality for carrying out the driving is implemented in terms of programming in the form of operating software (firmware), such that the driving—optionally in interaction with a user—is carried out automatically when the operating software is executed in the microcontroller.

Alternatively, however, in the context of the invention, the controller can also be formed by a non-programmable electronic component, e.g. an application specific integrated circuit (ASIC), in which the functionality for controlling the method is implemented using circuitry means.

In one particularly operationally safe embodiment, an overcurrent protection unit is connected upstream of the hybrid switch. As a result, the switching task of the disconnecting device is performed by the semiconductor switches under load and by the overcurrent protection unit in the case of a short circuit. In particular, this ensures a safe galvanic interruption of the current path in the case of a fault.

In one advantageous embodiment, the overcurrent protection unit is embodied as a fast-acting fuse, for example in the form of a current-carrying expanding or fusible wire. This ensures a galvanic isolation of the current path in the case of a fault.

An additional or further aspect of the invention provides the application of the disconnecting device described above in an on-board electrical system of a motor vehicle. In this case, the on-board electrical system contains a DC circuit having an energy store and at least one current path. The energy store is embodied for example as an electrochemical battery system connected to the current path as a DC source. In this case, the current path is led for example to a link circuit of the on-board electrical system. In this case, the disconnecting device is interconnected into the current path. An on-board electrical system that is particularly operationally safe and can be turned off reliably is realized as a result.

An exemplary embodiment of the invention is explained in greater detail below with reference to a drawing, in which the sole FIGURE shows, in a schematic and simplified illustration, an on-board electrical system for a motor vehicle, having a disconnecting device for interrupting a DC circuit.

Other features which are considered as characteristic for the invention are set forth in the appended claims.

Although the invention is illustrated and described herein as embodied in a disconnecting device for interrupting a direct current of a current path, and an on-board electrical system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The single FIGURE of the drawing is a schematic and simplified illustration of a motor vehicle 2 according to the invention.

DETAILED DESCRIPTION OF THE INVENTION

Referring now to the figures of the drawings in detail and first, particularly to FIG. 1 thereof, there is shown a motor vehicle 2 and a partially illustrated on-board electrical system 4. The on-board electrical system 4 is embodied with an electrochemical battery system 6 as an energy store or DC source. A respective current path 8, 10 is connected to poles of the battery system 6. The current path 8 connected to a positive pole of the battery system 6 and is also referred to hereinafter as the positive path and the current path 10 is connected to a negative pole of the battery system 6 and is also referred to hereinafter correspondingly as a negative path.

In the exemplary embodiment shown, a disconnecting device 12 for interrupting a direct current is interconnected in the positive path 8. The disconnecting device 12 contains a hybrid switch 14 and an overcurrent protection unit 16 connected upstream thereof. In this case, the overcurrent protection unit 16 is embodied as a fusible link, for example.

The hybrid switch 14 contains a current-carrying mechanical contact system 18 in the form of a switch, with which a semiconductor switch 20 is connected in parallel. Furthermore, a resistance cascade 22 as a cascading switch-off overvoltage limiter of the disconnecting device 12 is interconnected in parallel with the semiconductor switch 20 and with the switching path of the contact system 18.

In the exemplary embodiment shown, the resistance cascade 22 contains an ohmic resistor 24 and a semiconductor switch 26 connected in series therewith. A further semiconductor switch 28 is interconnected in series with the resistance cascade 22, the further semiconductor switch being connected to the negative path 10 on the output side. The semiconductor switches 20, 26, 28 are connected to a common controller 30 on the driving control side.

The semiconductor switches 20, 26 and 28 are embodied as power semiconductors, in particular as transistors, preferably as IGBTs (Insulated-Gate Bipolar Transistor). In this case, the input or collector terminals of the semiconductor switches 20 and 26 are interconnected between the overcurrent protection unit 16 and the contact system 18. In this case, the output or emitter terminal of the semiconductor switch 26 is connected between the resistor 24 and the input or collector terminal of the semiconductor switch 28. The semiconductor switch 28 is connected to the negative path 10 on the output or emitter side.

During switched-on or current-carrying operation of the disconnecting device 12, the semiconductor switches 20, 26 and 28 are switched off, that is to say switched to be blocking or electrically nonconducting, and the mechanical contact system 18 is closed. As a result, a direct current of the battery system 6 is carried only via the mechanical contacts of the contact system 18. Particularly low on-state losses of the disconnecting device 12 are ensured as a result.

In the course of a switch-off process, that is to say a disconnecting process, of the disconnecting device 12, the contact system 18 with current flowing through it is opened. When the contact system 18 is opened, an arc forms on account of the applied operating or on-board electrical system voltage of the on-board electrical system 4.

When the contact system 18 is opened, the controller 30 turns on the semiconductor switch 20, such that the arc current occurring commutates to the semiconductor switch 20 and is thereby quenched. The controller 30 also switches on the semiconductor switch 26 of the resistance cascade 22 substantially simultaneously with the semiconductor switch 20.

As soon as the switching path of the contact system 18 has a sufficient electric strength, the semiconductor switch 20 is turned off, as a result of which the current through the resistance cascade 22 is forced step by step to zero via the resistor 24. In this case, a sufficient electric strength should be understood to mean, in particular, quenching of the arc. In order reliably to avoid contact voltages at the contact system 18 that are dangerous to persons despite absence of galvanic isolation, the semiconductor switch 28 is turned on by the controller 30. As a result, the contact system 18 is short-circuited by the series circuit comprising the resistor 24 and the semiconductor switch 28. The series circuit thus forms a low-resistance connection between the positive path 8 and the negative path 10. In the case of a fault, the overcurrent protection unit 16 would thus trigger and thereby galvanically interrupt the positive path 8 reliably and operationally safely.

During a switch-on process of the disconnecting device 12, first the semiconductor switch 28 is switched off, that is to say driven to be blocking, by the controller 30. Afterward, the semiconductor switch 26 is switched on and a load or link circuit connected to the on-board electrical system 4 is thus precharged via the resistor 24 of the resistance cascade 22. Once the charging current flowing in this case has decayed to a certain value, the semiconductor switch 20 is switched on by the controller 30. In order to monitor the charging current, the controller 30 contains for example an ammeter (not illustrated in more specific detail) in the positive path 8.

The mechanical contact system 18 is bridged by the turned-on semiconductor switch 20, as a result of which the latter can be switched on with no voltage. Wear of the mechanical contacts of the contact system 18 is avoided reliably and simply as a result. On account of the lower forward voltage of the mechanical switching path, the current thus commutates completely from the semiconductor switch 20 to the contact system 18. Finally, the semiconductor switches 20 and 26 are switched off with no current by the controller 30.

Consequently, during the operation of the disconnecting device 12, the semiconductor switches 20, 26 and 28 are subjected only to momentary and low loadings. As a result, heat losses of the semiconductor switches 20, 26 and 28 are reduced, as a result of which a heat sink of the disconnecting device 12 can essentially be dispensed with.

The switching task of the disconnecting device 12 is performed by the semiconductor switches 22, 26 and 28 under load and by the overcurrent protection unit 16 in a short circuit or in the case of a fault. As a result, it is possible to dimension the switching point of the contact system 18 only with regard to the on-board electrical system currents to be carried.

The invention is not restricted to the exemplary embodiment described above. Rather, other variants of the invention can also be derived therefrom by the person skilled in the art, without departing from the subject matter of the invention. In particular, furthermore, all individual features described in association with the exemplary embodiment are also combinable with one another in some other way, without departing from the subject matter of the invention.

In particular, it is conceivable, for example, for the resistance cascade 22 to comprise a plurality of cascadingly switched pairings of resistors 24 and semiconductor switches 26, such that the resistors 24 can be supplementarily switched in or switched out step by step or progressively by means of the semiconductor switches 26. This enables a particularly effective and operationally safe dissipation of heat losses in the course of the current commutation.

The following is a summary list of reference numerals and the corresponding structure used in the above description of the invention:

2 Motor vehicle
4 On-board electrical system
6 Battery system/energy store
8 Current path/positive path 10 Current path/negative path
12 Disconnecting device
14 Hybrid switch
16 Overcurrent protection unit
18 Contact system
20 Semiconductor switch
22 Resistance cascade
24 Resistor
26 Semiconductor switch
28 Semiconductor switch
30 Controller

The invention claimed is:

1. A disconnecting device for interrupting a direct current of a current path, comprising:
   a hybrid switch having a current-carrying mechanical contact system and a first semiconductor switch connected in parallel with said current-carrying mechanical contact system; and
   a switchable resistance cascade having at least one ohmic resistor, said switchable resistance cascade being connected in parallel with said current-carrying mechanical contact system of said hybrid switch;
   said switchable resistance cascade containing at least one second semiconductor switch connected in series with said at least one ohmic resistor;
   a third semiconductor switch;
   said switchable hybrid switch configured to be short-circuited by means of a series circuit formed by said switchable resistance cascade together with said third semiconductor switch; and
   a common controller, each of said first, second and third semiconductor switches being connected to said common controller on a driving side.

2. The disconnecting device according to claim 1, further comprising an overcurrent protection unit connected upstream of said hybrid switch.

3. The disconnecting device according to claim 2, wherein said overcurrent protection unit is embodied as a fusible link.

4. The disconnecting device according to claim 1, wherein said switchable resistance cascade is embodied as a cascading switch-off overvoltage limiter.

5. The disconnecting device according to claim 1, wherein the disconnecting device is for interrupting the current path of an on-board electrical system of a motor vehicle.

6. An on-board electrical system for a motor vehicle, the on-board electrical system comprising:
   a DC circuit having an energy store, a current path, and a disconnecting device according to claim 1 disposed in said current path.

7. A disconnecting device for interrupting a direct current of a current path, comprising:
   a hybrid switch having a current-carrying mechanical contact system and a first semiconductor switch connected in parallel with said current-carrying mechanical contact system;
   a switchable resistance cascade having at least one ohmic resistor, said switchable resistance cascade being connected in parallel with said current-carrying mechanical contact system of said hybrid switch;
   said switchable resistance cascade containing at least one second semiconductor switch connected in series with said at least one ohmic resistor;
   a third semiconductor switch; and
   said current-carrying mechanical contract system of said hybrid switch configured to be short-circuited by means of a series circuit formed by said switchable resistance cascade together with said third semiconductor switch.

* * * * *